United States Patent [19]

Kamezawa et al.

[11] Patent Number: 4,794,478
[45] Date of Patent: Dec. 27, 1988

[54] IMPROVED LOADING DEVICE FOR CASSETTE RECORDING PLAYBACK APPARATUS

[75] Inventors: Shunsuke Kamezawa, Katsuta; Kimio Ohga, Mito, both of Japan

[73] Assignee: Hitachi Video Engineering, Tokyo, Japan

[21] Appl. No.: 844,507

[22] Filed: Mar. 27, 1986

[30] Foreign Application Priority Data

Mar. 27, 1985 [JP] Japan ................... 60-60648

[51] Int. Cl.⁴ .......................................... G11B 15/66
[52] U.S. Cl. .................................. 360/96.6; 360/96.5
[58] Field of Search .................. 360/96.5, 96.6, 96.3, 360/93

[56] References Cited

U.S. PATENT DOCUMENTS 3,936,011 2/1976 Staar ................................ 242/198
4,484,240 11/1984 Yoshida ............................ 360/96.5

Primary Examiner—John H. Wolff
Attorney, Agent, or Firm—Antonelli, Terry & Wands

[57] ABSTRACT

A cassette holder which includes a cassette stage for holding a cassette, along with a pair of X-shaped pivotal right and left link mechanisms for holding the cassette stage. Each of the link mechanisms include a first end which is held by a chassis whereby the link mechanisms support the cassette stage in such a manner that the cassette stage moves upward and downward relative to the chassis along a predetermined path. Lid supporting plates are pivotally held against the right and left walls of the cassette stage, with each of the plates being engaged with one end of each of the X-shaped pivotal link mechanisms. The lid supporting plates are pivoted relative to the cassette stage in accordance with an upward and downward movement of the cassette stage.

5 Claims, 2 Drawing Sheets

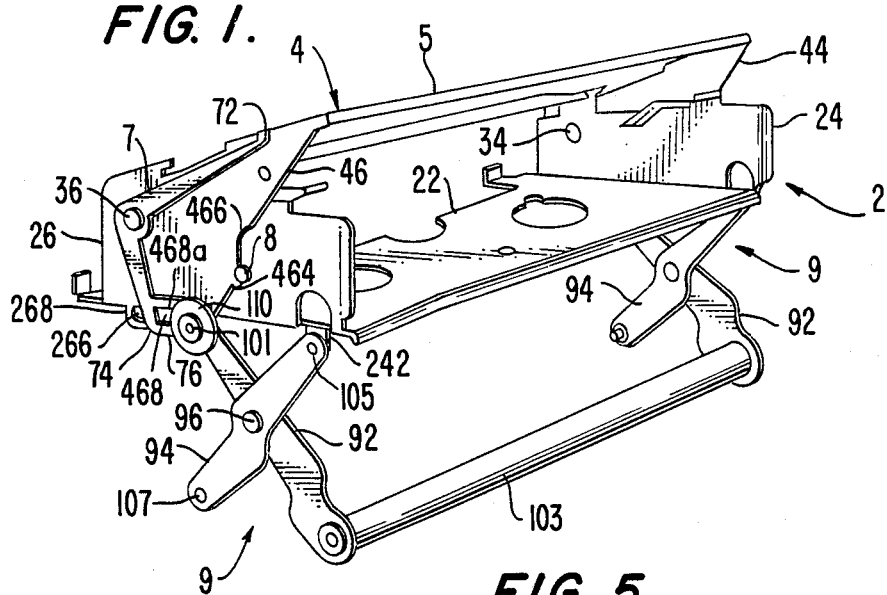
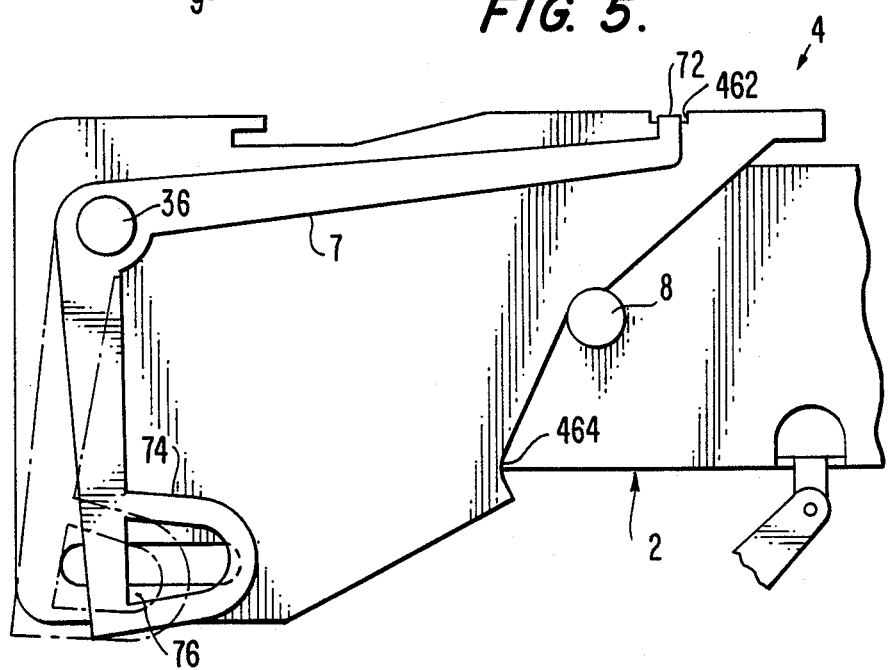
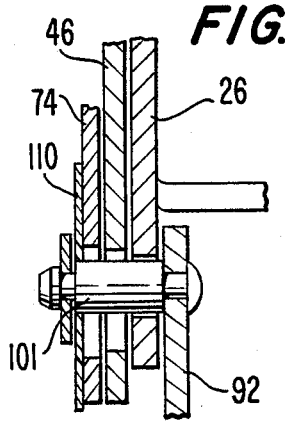
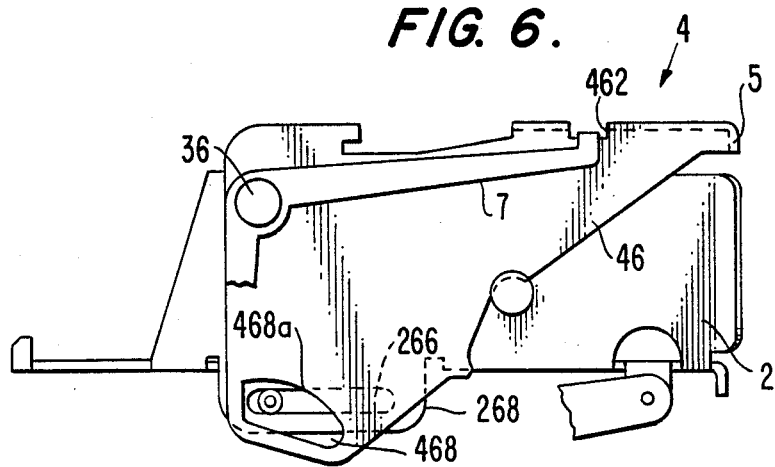

IMPROVED LOADING DEVICE FOR CASSETTE RECORDING PLAYBACK APPARATUS

BACKGROUND OF THE INVENTION

The present invention relates to a cassette holder and, more particularly, to a cassette holder for a cassette recording/playback apparatus such as, for example, a video cassette recording/playback apparatus.

In, for example, U.S. Pat. No. 3,936,011, a tape cassette holder is proposed having a cassette tray into which a cassette is inserted, and a pair of side walls between which the cassette tray is movable in a direction perpendicular to a surface of the side walls. A disadvantage of this proposed cassette holder resides in the fact that holder includes a space which is unnecessary during a recording or reproducing operation but which is necessary for the cassette to be inserted into and removed from the cassette holder. Consequently, the proposed apparaus is not of a small size.

The aim underlying the present invention essentially resides in providing a cassette holder of the aforementioned type which is compact and of a relatively small size.

According to the present invention, a cassette holder is provided which includes a base means or chassis and a cassette tray selectively movable upwardly from the base means so as to form, with a lid or cover, a space into which the cassette may be inserted and removed. A supporting means rotatably supports the lid or cover in response to an angle of rotation thereof, with the space, formed by the cassette tray and the lid or cover, increasing upon an increase of the angle of rotation. Coupling means are connected to the base means, the cassette tray, and the supporting means, for moving the cassette tray upwardly and rotating the support means in such a manner that the angle of rotation of the supporting means increases in accordance with an increase of a distance between the base means and the cassette tray.

In accordance with an embodiment of the the present invention, the cassette holder includes a pair of X-shaped pivotal link mechanisms for holding the cassette tray, with each of the link mechanisms having one end thereof which is held by a chassis whereby the link mechanism support the cassette stage in such a manner that the cassette tray moves upward and downward relative to the chassis along a predetermined path. Lid supporting means are pivotally held against the right and left side walls of the cassette tray, with each of the lid supporting means being engaged with one of the X-shaped pivotal link mechanisms so that the lid supporting means are pivoted relative to the cassette tray in accordance with the upward and downward movements of the cassette tray.

The holder means may, in accordance with the present invention, include a base plate and a pair of side walls, each extending downwardly from opposite ends of the base plate and including a slot in a lower portion thereof. The support means comprises a base plate connected to the lid or cover means and a pair of spaced sidewalls extending downwardly from opposite ends of the base plate of the support means. Each of the side walls of the base plate of the support means includes a hole or opening in a lower portion thereof and the side walls of the support means are pivoted to respective side walls of the holder means.

The pair of X-shaped link mechanisms of the present invention may, for example, each include a first link member having a first end connected to the holder means and a second link member having a first end movably disposed in a longitudinal direction in a slot formed in respective side walls of the base means, or chassis with the respective slots being adapted to regulate a position of the first end of the second link member. The pair of side walls of the base means or chassis also include a reception portion pivotally connected to the second end of the respective first link members. To ensure a flawless and smooth operation of the X-shaped link mechanism, according to the present invention, it is possible to provide a synchronizing shaft, pivotally connected to the second ends of the respective first link members of the pair of X-shaped link mechanisms. The synchronizing shaft is mounted at the reception portions of the side walls of the base means or chassis.

In accordance with still further features of the present invention, the cassette holder further includes a pair of L-shaped elastic pieces each of which have one end connected to the base plate of the support means, a corner portion which pivotally and coaxially connected to both walls of the holder means and the support means, and another end which includes a hole or opening which is shorter or less than the hole of the side wall of the base means in a longitudinal direction of the slot and which is compulsorily moved in the longitudinal direction by the first end of the first link member of the X-shaped link mechanisms.

These and other objects, features, and advantages of the present invention will become more apparent from the following description when taken in connection with the accompanying drawings which show, for the purpose of illustration only, one embodiment in accordance with the present invention.

BRIEF DESCRIPTION OF THE DRAWINGS

FIG. 1 is a perspective view of a cassette holder constructed in accordance with the present invention;

FIG. 4 is a cross-sectional view, on an enlarged scale, of a detail of joint part of the cassette holder constructed in accordance with the present invention; and FIGS. 5 and 6 are partially schematic side views of the cassette holder of FIG. 1 with FIG. 5 showing a somewhat exaggerated movement of the flexible L-shaped piece.

DETAILED DESCRIPTION

Figure 2:
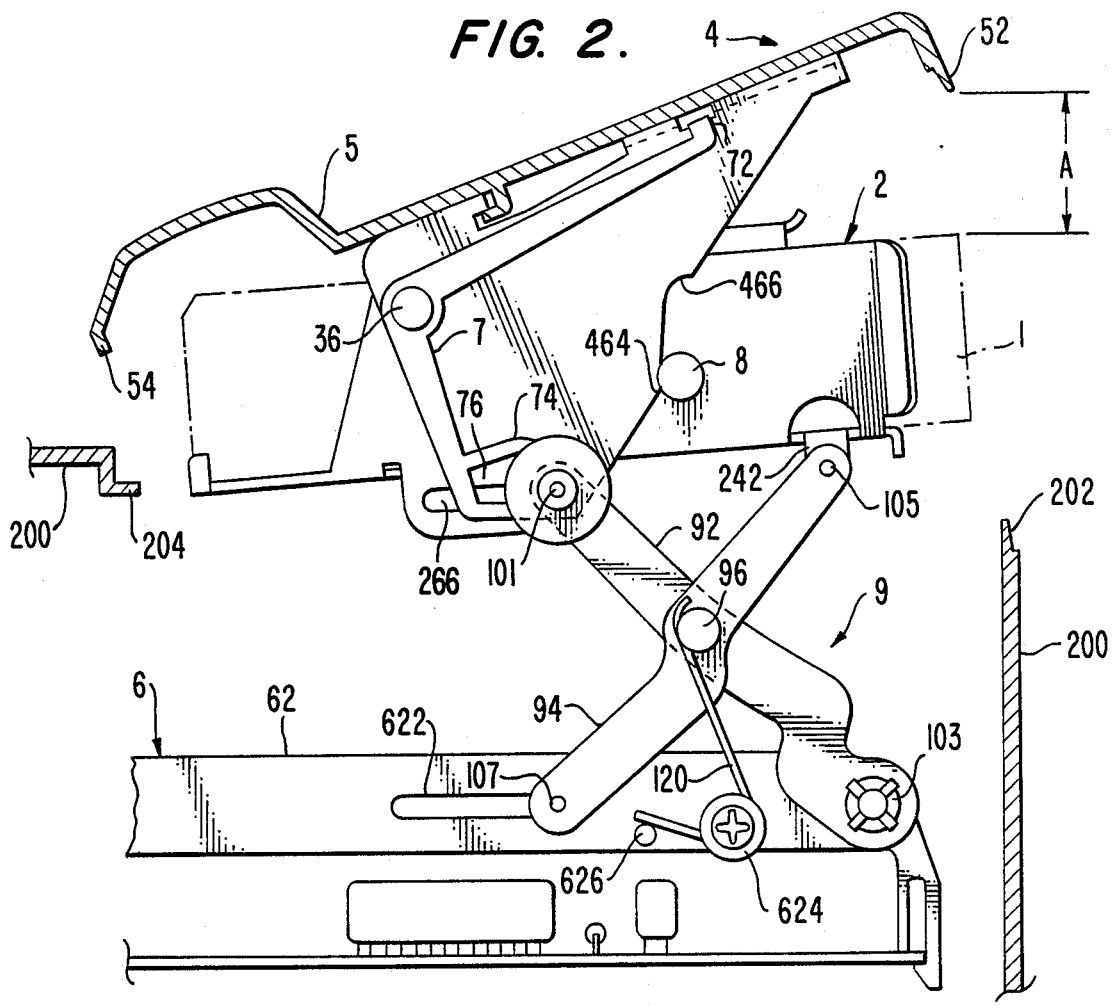
FIG. 2 is a partial cross-sectional side view of the cassette holder of FIG. 1 in a position wherein a cassette tray is raised and a lid or cover of the holder is in an open position.

Referring now to the drawings wherein like reference numerals are used throughout the various views to designate like parts and, more particularly, to FIGS. 1 and 2, according to these figures, a cassette holder according to the present invention includes a cassette tray generally designated by the reference numeral 2 having a base plate 22, spaced side walls 24, 26 provided at opposite ends of the base plate, and a lid support or cover structure generally designated by the reference numeral 4. The side walls 24, 26 along with a lid or cover 5 (shown in FIG. 2) and the base plate 22 define a space in the cover or lid structure 4 for accommodating or storing a cassette 1. The lid or cover structure 4 also includes spaced side walls 44, 46 which are respectively rotatably connected to the side walls 24, 26 of the bse plate 22 by shafts 34, 36. A slot 266 is provided in each of the side walls 24, 26 of the cassette tray in a projection from the base plate 22. An opening 468 is provided in each of the side walls 44, 46 42, with each associated with the lid or cover 5 opening including at least one edge 468a extending over an arcuate or curved path. The cassette tray 2 is mounted so as to be movable between an upper open position shown in FIG. 2 and a lower closed position shown in FIG. 3 and vice versa, and the cover structure 4 is rotatable in a clockwise and counterclockwise direction in accordance with a movement of the cassette tray 2. More particularly, an angle of rotation of the structure 4 in the counterclockwise direction is the smallest when the cassette tray 2 is in the lowest position and largest when the cassette tray 2 is at the highest position.

A pair of substantially L-shaped flexible arms 7 are provided and are respectively secured to shafts 34, 36, with each of the arms 7 being elastically deformable and coaxially pivotable together with the lid or cover structure 4. The pair of arms 7 are respectively mounted along the side walls 24, 26 of the structure 4. One end 72 of each of the arms 7 is supported or fixed at a small opening or recess 462 of the structure 4, with an opposite end 74 of each of the arms 7 being provided with a hole or opening 76. A shaft portion 8 is provided in each of the side walls 24, 26 of the base plate 22, with the shaft portions 8 cooperating with respective guiding edges of the side walls 44, 46 of the upper plate 22 defined between projections 464, 466 so as to enable a regulation of a rotation range of the cover structure 4.

A link mechanism generally designated by the reference numeral 9 is provided for regulating, controlling and driving the movements of the cassette tray 2 and rotation of the structure 4. The link mechanism 9 is disposed on the right and left sides of the cassette tray 2 and, since the link mechanism 9 is of a symmetrical construction, description of the same will be limited with respect to one side thereof.

The link mechanism 9 includes two link members 92, 94 pivotally connected to each other by a shaft 96 in order to link or connect the cassette tray 2 and the structure 4 to a chassis generally designated by the reference numeral 6. The shaft 96 connects the link members 92, 94 to each other in such a manner that the link mechanism 9 has a substantially X-shaped configuration. One end of the link member 92 is connected to opening 468 provided in the side wall 46 of the structure 4 and a hole or opening 76 in the arm 7 by a shaft 101 which is movable in slot 266, opening 468 and hole or opening 76 (FIG. 6), while an opposite end of the link member 92 is connected to a synchronizing shaft 103 which is held or mounted on the side wall 62 of the chassis 6, with the synchronizing shaft 103 being adapted to synchronize an operation of the pair of link members 92, 94 of the link mechanism 9. One end of the link member 94 is rotatably connected by a shaft 105 to a projection cut 242 provided at a front corner intersecting the base plate 22 and the side wall 26, while an opposite end of the link member 94 is connected to a slot 622 provided in the side wall 62 of the chassis 6 by a shaft 107 which is movable in the slot 62. All of the shafts, 96, 101, 103, 105 and 107 are locked or secured to the respective portions of the link members 92, 94 by suitable fastening means so as to prevent an inadvertent or accidental disconnection between the link members 92, 94 and the respective shafts during operation and, for example, the shaft 101 may be locked by a washer 110 and a lock means 110, such as, for example, a C-clip (FIG. 4).

As shown most clearly in FIG. 2, a torsion spring 120 is held or mounted at a projection 624 provided on the side wall 62 of the chassis 6. One end of the torsion spring 120 is in abutment with the projection 626 provided on the side wall 62 and the other end of the torsion spring 120 is engaged or abuts with a shaft 96 of the X-shaped link mechanism 9 so as to push or urge the shaft 96 in an upward direction.

When the cassette tray 2 is raised as shown in FIG. 2 and the cassette 1 is inserted therein, a sufficient gap A is secured or obtained between the cassette 1 and the lid or cover 5 so that the cassette 1 may be handled or manipulated in the gap A when inserted and removed. After the cassette 1 is inserted and the lid or cover 5 is manually pushed down, the cassette tray 2 follows a path determined by the X-shaped lnk mechanism 9 and drops to a closed position shown in FIG. 3 and is locked therein by a lock mechanism (not shown) provided at the front bottom of the cassette tray 2 and a front end of the chassis 6. In the closed position of FIG. 3, the respective edges 52, 54 of the lid or cover 5 are disposed the nearest to edges 202, 204 of a casing member 200 and a dimension of the gap A between the cassette 1 and the lid or cover 5 is reduced to a gap B which is very small in comparison with the dimensions of the gap A (FIG. 2). The cassette tray 2 is lowered in the following series of movements. A downward pushing force applied to the lid or cover 5 acts on the cassette tray 2 through the shafts 34, 36 so as to lower the cassette tray 2. At the same time, the curved edge 468a of the opening 468 in the side wall 46 lowers the shaft 101 so that the shaft 101 is moved downward and to the left and the shaft 107 is moved to the left in slot 622. That is, the pushing force supplied to the lid or cover 5 lowers and pivots the structure 4 and lowers the cassette tray 2 to cause the X-shaped linkage mechanism 9 to be closed. When the cassette tray 2 is moved from the position shown in FIG. 2 to the position shown in FIG. 3, torsion spring 120 is bent or deformed by a lowering of the shaft 96 to store energy for enabling a raising of the shaft 96.

Figure 3:
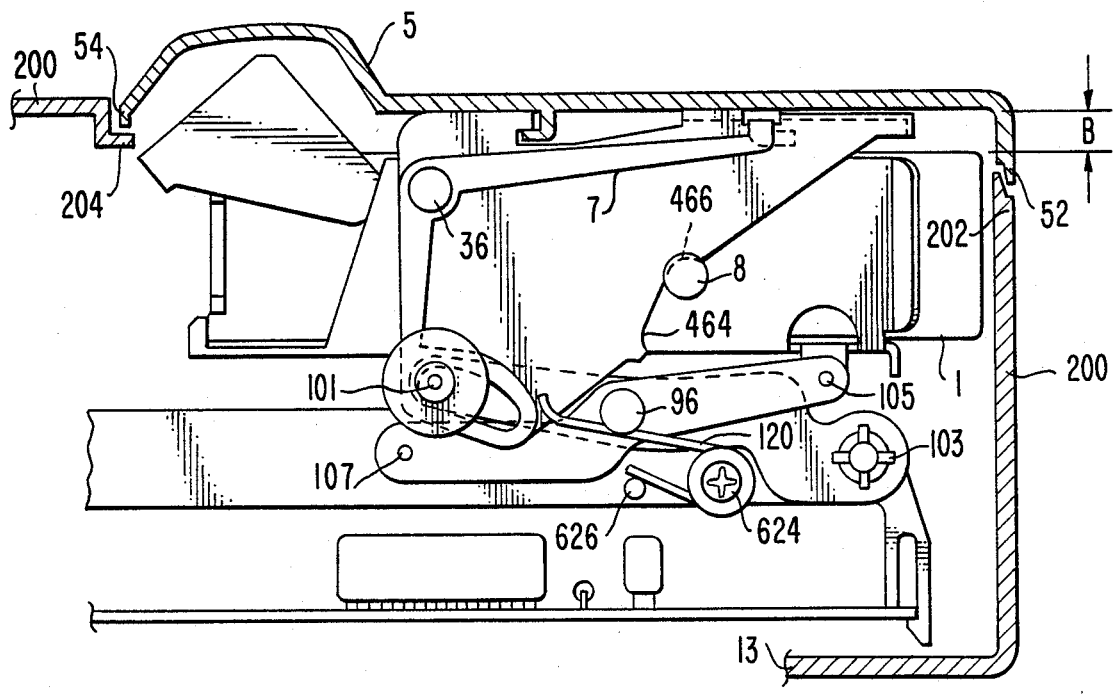
FIG. 3 is a side view of the cassette holder of FIG. 1 in a position wherein the cassette stage is lowered and the lid or cover of the holder is in a closed position.

When the cassette tray 2 is raised to the position shown in FIG. 2 from the position shown in FIG. 3 by releasing the lock mechanism at the front end, the cassette tray 2, structure 4, and the associated components moved during a lowering of the cassette tray 2 are moved accordingly along a locus which is reversed to that taken during a lowering operation of the cassette tray by virtue of the spring force of the torsion spring 120.

Since shaft 101 is moved to the left in slot 468 and holes 76 by link member 92 after the rotation of the support 4 is stopped by the shaft 8 engaging the projection 466 (FIG. 5), the elastic arm 7 is bent or deformed by the movement of the shaft 101 as shown greatly exaggerated in phantom lines in FIG. 5. Therefore, the arm 7 operates to push the structure 4 downward by the end 72 thereof to prevent the structure 4 from shaking or chattering and also make the locking operation considerably smoother.

While we have shown and described only one embodiment in accordance with the present invention, it is understood that the same is not limited thereto but susceptible to numerous changes and modifications as known to one having ordinary skill in the art and we therefore do not wish to be limited to the details shown and described herein, but intend to cover all such modification as are encompassed by the scope of the appended claims.

We claim:

1. A cassette loading device, comprising:
   a chassis;
   a tray for forming a space for accommodating a cassette therein and being mounted for upward and downward movement relative to said chassis;
   a cover operatively associated with said tray to define a boundary of said space for accommodating the cassette;
   means for both supporting and enabling rotation of said cover as said means rotates through an angle such that said space formed by said tray and cover increases in response to an increase of said angle during movement of said cover toward an open position of the cassette loading device; and
   a link mechanism connected to said chassis, said tray and said means to allow movement of said tray and rotation of said means such that said angle becomes larger as the distance between said chassis and tray increases.

2. A cassette loading device according to claim 1, wherein said tray comprises a base plate and a pair of side walls extending upwardly from opposite ends of said base plate, said means comprises an upper plate connected to said cover and a pair of spaced side walls extending downwardly from opposite ends of said upper plate adjacent to and pivotally connected with said side walls extending upwardly from said base plate, each of said side walls extending downwardly from said upper plate having an opening in the lower end portion thereof, said chassis having a pair of spaced side walls, each of which is provided with a guide slot for regulating movement of the cassette loading device, said link mechanism having a pair of link members, a first link member of each pair having a first end connected to said tray and a second end mounted in said guide slot so as to be longitudinally displaceable therein, a second link member of each pair having one end pivotally connected with said means and said tray and having a second end pivotally received in each side wall of said chassis, and a pivotal connection being provided between each pair of link members so that each pair has a substantially X-shaped configuration, and said chassis further.

3. A cassette loading device according to claim 2, further comprising a synchronizing shaft having oppositely disposed ends pivotally connected with the second end of said second link members in each side wall of said chassis.

4. A cassette loading device according to claim 3, further comprising a pair of substantially L-shaped arms, each having a first end portion connected to said upper plate, a corner portion pivotally and coaxially connected with the respective side walls of said tray and said means, and a second end portion having an opening with a longitudinal dimension smaller than a longitudinal dimension of said guide slot, wherein said corner portion is forcibly biased in the longitudinal direction of said guide slot by a movement of said first end of said second link member.

5. A cassette loading device according to claim 2, further comprising a pair of substantially L-shaped arms, each having a first end portion connected to said upper plate, a corner portion pivotally and coaxially connected with the respective side walls of said tray and said means, and a second end portion having an opening with a longitudinal dimensiom smaller than a longitudinal dimension of said guide slot, wherein said corner portion is forcibly biased in the longitudinal direction of said guide slot be a movement of said first end of said second link members.

* * * * *

UNITED STATES PATENT AND TRADEMARK OFFICE
CERTIFICATE OF CORRECTION

PATENT NO.   :   4,794,478
DATED        :   Dec. 27, 1988
INVENTOR(S)  :   KAMEZAWA, et al

It is certified that error appears in the above-identified patent and that said Letters Patent is hereby corrected as shown below:

ON THE TITLE PAGE:

Please correct the [73] Assignee: from "Hitachi Video Engineering" to --Hitachi, Ltd. and Hitachi Video Engineering, Inc.--

Signed and Sealed this

Eighth Day of December, 1992

Attest:

DOUGLAS B. COMER

*Attesting Officer*          Acting Commissioner of Patents and Trademarks